Aug. 19, 1952 W. S. PERCIVAL 2,607,889
RADIO RECEIVER
Filed Dec. 20, 1946
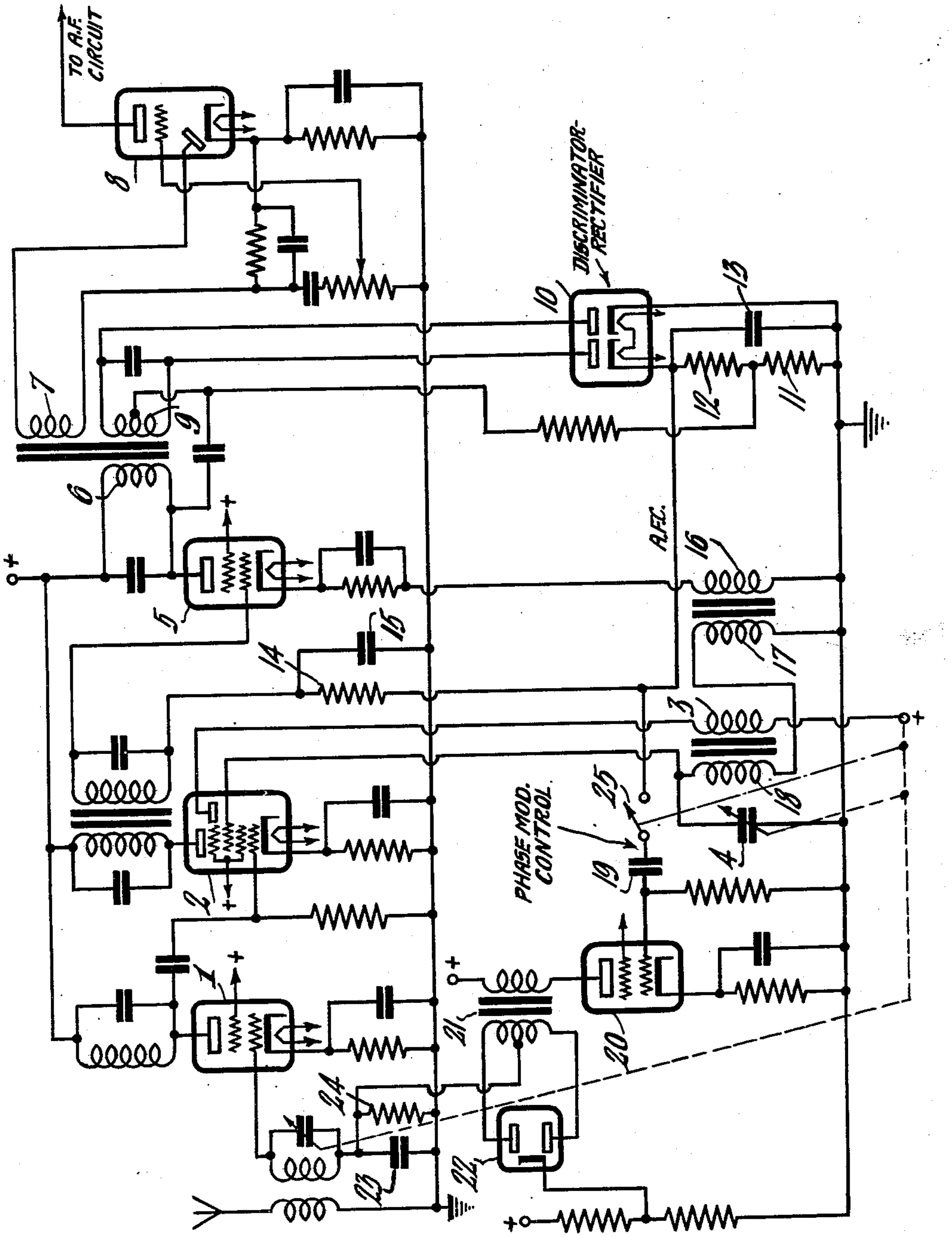
INVENTOR
William S. Percival
BY H. S. Grover
ATTORNEY Patented Aug. 19, 1952

2,607,889

UNITED STATES PATENT OFFICE 2,607,889

RADIO RECEIVER

William S. Percival, London, England, assignor to Electric & Musical Industries Limited, Middlesex, England, a company of Great Britain Application December 20, 1946, Serial No. 717,427
In Great Britain June 23, 1945

5 Claims. (Cl. 250—20)

This invention relates to receivers for amplitude modulated radio frequency carrier waves, and has for its object the provision of improved means for reducing or eliminating the effects of interference. The invention is based on the fact that, in general, the interference will cause phase modulation of the carrier wave.

According to the invention there is provided a receiver for amplitude modulated carrier waves, having a discriminator circuit for effecting automatic frequency control of the receiver and wherein means are provided whereby an output of said discriminator circuit in response to phase modulation of a received carrier wave is arranged to control the gain of said receiver in such manner that said gain is reduced when the carrier wave is phase modulated or phase modulated to a predetermined degree.

In a preferred embodiment of the invention the output from said phase discriminator circuit in response to phase modulation of the carrier wave is applied to an amplifying valve the output from which is applied to the control of the gain of said receiver and wherein the automatic frequency control voltage of said discriminator circuits is also applied to said amplifying valve so as to bias said valve to cut-off when said receiver is being tuned or when the automatic frequency control voltage is operating to correct the tuning of the receiver.

In order that the said invention may be clearly understood and readily carried into effect, the same will now be more fully described with reference to the accompanying drawing, the single figure of which is a circuit diagram of part of a superheterodyne receiver embodying the invention.

Referring to the drawing the receiver has a conventional h-f amplifying stage which includes h-f amplifying valve 1 the output from which is fed to the input circuit of an oscillator mixer valve 2 the local oscillator circuit of which includes an inductance 3 and a condenser 4, the capacitance of which is variable for the purpose of varying the frequency of the local oscillations and so tuning the receiver. The output from valve 2, consisting of a modulated carrier wave of intermediate frequency, is fed to the control electrode of an i-f amplifying valve 5. The output circuit of valve 5 includes a coil 6 which is inductively coupled with a coil 7 included in the input circuit of a diode triode detector valve 8, and the output from valve 8 is fed to an audio frequency amplifying stage (not shown). The coil 7 is also inductively coupled with the coil 9 of a phase discriminator comprising a double diode 10 the output circuit of which comprises resistances 11 and 12 shunted by a condenser 13. The operation of a frequency discriminator of the kind illustrated is well known and it will suffice to say that if the mid-frequency of the i-f carrier wave in the output of valve 5 is the same as the predetermined mean frequency for which the discriminator is adjusted, equal and opposite potentials appear across the resistances 11 and 12. If however the frequency of the i-f carrier wave departs from this mean frequency, by reason of the receiver being off-tune, the potentials across resistance 11 and 12 will have a resultant the sign of which depends on the direction in which the i-f carrier frequency departs from the said mean frequency. This resultant potential is applied through the low pass smoothing filter 11, 13, 14, 15 of relatively long time constant to the control electrode of valve 5, and the resulting change in the relative potential of this control electrode causes an alteration in the current flow through valve 5 with the result that the degree of saturation of the core of the transformer comprising inductance 16 in the cathode lead of valve 5 and the inductance 17 is varied, thereby varying the effective inductance of the inductance 17 and likewise of the coupled inductances 18 and 3. The tuning of the oscillator circuit of valve 2 is accordingly altered whereby the frequency of the local oscillations is altered so that the i-f again becomes equal to the predetermined mean frequency of the discriminator.

The output circuit of the double diode rectifier 10 is also connected, through a condenser 19, to the input circuit of an amplifying valve 20. In the event of the i-f carrier wave in the output from valve 5 being phase modulated as a result of interference, such modulations will be detected by the discriminator and converted into audio frequency potentials across the resistances 11, 12. The time constant of the resistances 11 and 12 and the condenser 13 is sufficiently short to pass audio frequencies. These audio frequency potentials are applied to the control electrode of amplifying valve 20 the output circuit of which includes a transformer 21 feeding a full wave rectifier 22, the output from which is applied, after smoothing by filter 23, 24 of relatively short time constant, for example, 0.01 second, to the control electrode of valve 1, said rectification ensuring that the potential applied to the control electrode of valve 1 is always of such sign as to tend to bias valve 1 to cut-off. The normal bias applied to valve 20 is preferably such that the valve 1 is not cut-off until the interference reaches a predetermined level. If desired a long time constant circuit may be included so as to prevent audio frequency potentials from reaching the control electrode of valve 5.

Phase modulation of the i-f carrier may result when the receiver is being tuned, and to prevent the valve 1 from being cut-off during tuning a switch 25 is provided in the connection from the discriminator to the control electrode of valve 20. This switch 25 should be opened during the operation of tuning of the receiver but closed when the receiver is in tune and transient interference is experienced. The switch 25 may be coupled to the tuning control of the receiver so that it is automatically opened when the tuning control is being actuated. Alternatively, the frequency control voltage smoothed by the filter 14, 15 may also be applied to the control electrode of valve 20, in the same manner as to valve 5, in addition to the audio frequency voltage from the discriminator, in such manner, as by elimination of the condenser 19, that provided the valve 20 has proper grid-bias anode-current characteristic, it is biased off by said frequency control voltage when the receiver is off-tune and is permitted to operate under the control of the said audio frequency voltage only when the receiver is in tune and no frequency control voltage is present.

It will be understood that the audio frequency control voltage may be applied to any suitable valve of the receiver for the purpose of reducing the receiver gain during periods of interference, that is, it need not necessarily be applied, as shown, to the h-f amplifying valve 1.

What I claim is:

1. In a radio receiver for amplitude modulated carrier waves, the combination with a radio frequency amplifying stage, a local oscillator, and a frequency converting stage coupled to said amplifying stage and to said oscillator, of an intermediate frequency carrier wave amplifying stage having input and output circuits, said frequency converting stage being coupled to said input circuit, discriminating means coupled to said output circuit and having a load circuit in which output potentials vary in accordance with frequency variations of the input circuit, a first filter means coupling said load circuit to said input circuit, variable impedance means coupling said load circuit to said local oscillator, said impedance means being variable in response to variation of voltage applied thereto, said voltage being developed across said load circuit in response to a frequency shift in the intermediate frequency carrier waves to effect correction by said oscillator for said frequency shift, rectifying means coupled to said load circuit, and a second filter means coupling said rectifying means to said radio frequency amplifying stage and effecting a decrease in the gain of said radio frequency amplifying stage upon a voltage being developed across said load circuit in response to a phase shift of said amplitude modulated carrier waves.

2. In a radio receiver for amplitude modulated carrier waves, the combination as defined in claim 1, in which the first filter means comprises a resistance-capacitance filter having a relatively long time constant.

3. In a radio receiver for amplitude modulated carrier waves, the combination as defined in claim 1, in which the second filter means comprises a resistance-capacitance filter having a relatively short time constant.

4. In a radio receiver for amplitude modulated carrier waves, the combination as defined in claim 1, in which there is provided means for tuning the radio frequency amplifying stage and switch means for rendering the rectifying means inoperative during tuning of said radio frequency amplifier stage.

5. In a radio receiver for amplitude modulated carrier waves, the combination as defined in claim 1, in which there is provided a first tuning means for the radio frequency amplifying stage, a second tuning means for the local oscillator, and unicontrol means linking said tuning means and operative during tuning operations to render the rectifying means inoperative.

WILLIAM SPENCER PERCIVAL.

REFERENCES CITED

The following references are of record in the file of this patent:

UNITED STATES PATENTS

| Number | Name | Date |
|---|---|---|
| 2,152,515 | Wheeler | Mar. 28, 1939 |
| 2,177,713 | Granqvist | Oct. 31, 1939 |
| 2,217,294 | Rust | Oct. 8, 1940 |
| 2,221,096 | Keall et al. | Nov. 12, 1940 |
| 2,256,078 | Crosby et al. | Sept. 16, 1941 |
| 2,261,374 | Koch | Nov. 4, 1941 |
| 2,280,563 | Weinberger | Apr. 21, 1942 |
| 2,357,984 | Travis | Sept. 12, 1944 |
| 2,369,585 | Lyman | Feb. 13, 1945 |
| 2,371,416 | Tunick | Mar. 13, 1945 |
| 2,395,738 | Hanson et al. | Feb. 26, 1946 |